US005708498A

United States Patent [19]
Rioux et al.

[11] Patent Number: 5,708,498
[45] Date of Patent: *Jan. 13, 1998

[54] THREE DIMENSIONAL COLOR IMAGING

[75] Inventors: Marc Rioux, Ottawa; Lawrence King, Kanata; Paul Fournier, Val-Belair, all of Canada

[73] Assignee: National Research Council of Canada, Ottawa, Canada

[*] Notice: The term of this patent shall not extend beyond the expiration date of Pat. No. 5,701,173.

[21] Appl. No.: 608,006

[22] Filed: Mar. 4, 1996

[51] Int. Cl.$^6$ .................................. G01B 11/24; G01J 3/50
[52] U.S. Cl. ......................... 356/73; 356/326; 356/376
[58] Field of Search .......................... 356/375, 376, 356/73, 402, 407, 425, 300, 326, 328

[56] References Cited

U.S. PATENT DOCUMENTS

| | | |
|---|---|---|
| 4,627,734 | 12/1986 | Rioux ............................ 356/376 |
| 4,946,281 | 8/1990 | Dell'Eva et al. ............... 356/376 |
| 5,177,556 | 1/1993 | Rioux ........................... 356/376 X |

OTHER PUBLICATIONS

Laser range finder based on synchronized scanners. Mar Rioux, 1 Nov. 1984/vol. 23, No. 21 Applied Optics. pp. 3837–3844.

*Primary Examiner*—K. Hantis
*Attorney, Agent, or Firm*—Neil Teitelbaum & Associates

[57] ABSTRACT

An optical method and apparatus is provided for determining the color and profile of a target surface of an object. The target surface is scanned with an incident beam of light containing a plurality of wavelengths including at least one well defined wavelength. A return beam reflected from the target is split into at a first and second return beam. The first return beam is utilized for detecting the profile of the target surface; and, a plurality of detectors are provided that detect color information corresponding to the target surface from the second return beam.

10 Claims, 3 Drawing Sheets

THREE DIMENSIONAL COLOR IMAGING

Cross-reference is made to a related copending application Ser. No. 08/603,422.

FIELD OF THE INVENTION

This invention relates to three dimensional (3-D) color imaging of a profile of a target surface.

BACKGROUND OF THE INVENTION

Monochromatic 3D imaging of objects is well known. It has applicability to the accumulation of detailed data on shapes and surface profiles of objects (articles, scenes, and/or persons) to the automatic inspection or assembly of objects, to robotics generally, and to various medical applications.

As of late, 3D color imaging has been demonstrated; and, interest and advances in this field are gaining momentum. For example, obtaining high resolution color and profile data of an object is of interest to persons cataloging and authenticating works of art. Furthermore, this color and profile data can be stored, electronically transported to a distant location and later viewed at the location, afar from where the imaged object resides; thus, virtual libraries of great works of art, museum objects and the like can be remotely visited and the stored imaged objects viewed from any location equipped with a communications link, such as a telephone line.

It has been known for many years that optical triangulation can yield accurate knowledge of range and of the profile of a target surface. Typical prior U.S. patents that describe implementation of the triangulation principle are U.S. Pat. No. 3,986,774 (Lowery et al.) Oct. 23, 1979; U.S. Pat. No. 4,171,917 (Pirlet) Sep. 14, 1982; U.S. Pat. No. 4,349,277 (Mundy et al.) Sep. 14, 1982); U.S. Pat. No. 4,627,734 (Rioux) Dec. 9, 1986; and U.S. Pat. No. 4,701,049 (Beckman et al.) Oct. 20, 1987.

The patents to Pirlet and Rioux teach triangulation configurations in which the surface is scanned by a beam of light. A synchronously scanning receiver images reflected light onto a position sensitive detector, e.g. a CCD (charge coupled device), to generate electrical signals indicative of range deviations of points on the surface from a reference plane.

Beckman et al. also disclose a measuring system employing the triangulation principle. This patent is directed to techniques for improving resolution by varying the cross-section of the measuring beam, and includes a feature of viewing a lighted dot on the target surface at two different angles to discriminate a true reflection from a false one.

Mundy et al employ the optical parallax triangulation principle in which a color pattern is projected onto the surface, shifts of wavelength bands being detected on separate detector arrays, these shifts corresponding to the profile of the surface.

U.S. Pat. No. 4,645,347, issued Feb. 24, 1987 to Rioux teaches another method of measuring profile. It uses a converging lens with a mask having two apertures. The spacing between images on a detector represents the range deviation of points on the target surface from a reference plane, e.g. the focal plane of the converging lens.

Alternatively, the range data can be detected by methods other than the triangulation method, such as by time of flight (radar) measurement. A full summary of the various methods of optical ranging is provided in "Active Optical Range Imaging Sensors" by Paul J. Besl, published in Machine Vision and Applications (1988) 1:127–152.

However, none of these known systems also collects data on the color of the target surface.

On the other hand, U.S. Pat. No. 5,177,556 in the name of Rioux issued Jan. 5, 1993 discloses a three dimensional color imaging method and apparatus for determining the color and profile of a target surface. Although Rioux's system is a significant advance over the prior art at that time, and though his system appears to perform its intended function, its functionality and performance are limited in some respects. For example, color detection is not possible if only one of red, blue and green light is present in the object being imaged. Furthermore, in some instances, the sensitivity of the system may be inadequate. As well, the system disclosed in U.S. Pat. No. 5,177,556 is adversely affected by noise present or fluctuations at the light source. Thus, a noisy input laser signal will result in output data adversely affected by the noise.

It is therefore an object of the present invention, to overcome some of the limitations and problems associated with the prior art.

It is a further object of the invention, to provide an imaging system that is capable of detecting color when only one of red, blue and green is present.

It is yet a further object of the invention, to provide output data wherein profile information and color information relating to an object are provided by separate detection means.

SUMMARY OF THE INVENTION

In accordance with the invention an optical method is provided for determining the color and profile of a target surface. The method comprises the steps of:

(a) scanning the target surface with an incident beam of light containing a plurality of wavelengths including at least one well defined wavelength;

(b) splitting the return that has reflected from the target surface into a plurality of separate return beams including at least a first and second return beam, the first and second return beam having essentially the same wavelengths of light;

(c) utilizing the first return beam that has reflected from the target surface for detecting the profile of the target surface; and, (d) utilizing the second return beam to detect color information corresponding to the target surface.

The invention further provides the method as defined above of determining the color and profile of a target surface and reducing noise at the input of the apparatus by including the additional steps of:

(i) tapping a portion of the beam of light before scanning the target surface in step (a), the tapped beam and the beam of light incident upon the target surface containing substantially the same ratio of red, green and blue light;

(ii) providing the tapped portion of the beam to a means for detecting the red, green and blue content of the tapped portion of the beam, and for generating signals representative of the red, green, and blue content of the tapped portion of the beam; and (iii) determining as a function of the signals generated in step (ii) representative of the color of the tapped portion of the beam and the signals representative of the color of the surface, normalized values representative of the color of the surface.

The invention further provides yet a more general method as defined above of determining the color and profile of a target surface and reducing noise at the input of the apparatus by including the additional steps of:

(i) tapping a portion of the beam of light before scanning the target surface in step (a);

(ii) providing the tapped portion of the beam to a means for detecting the information related to the spectral content of the tapped portion of the beam, and for generating signals representative of the spectral content of the tapped portion of the beam;

(iii) determining as a function of the signals generated in step (ii) representative of the color of the tapped portion of the beam and the signals representative of the color of the surface, normalized values representative of the color of the surface.

In another aspect of the invention an optical apparatus is provided for determining the color and profile of a target surface. The apparatus comprises:

(a) means for scanning the target surface with an incident beam of light containing a plurality of wavelengths including at least one well defined wavelength;

(b) means for splitting the return that has reflected from the target surface into a plurality of separate return beam including at least a first and second return beam;

(c) means for detecting the profile of the target surface in response to the first return beam that has reflected from the target surface; and, (d) means for detecting color information corresponding to the target surface in response to the second return beam.

Advantageously, normalization circuitry can be added to eliminate unwanted noise present at the input.

BRIEF DESCRIPTION OF THE DRAWINGS

Exemplary embodiments of the invention will now be described in conjunction with the drawings, in which.

DETAILED DESCRIPTION

Figure 1:
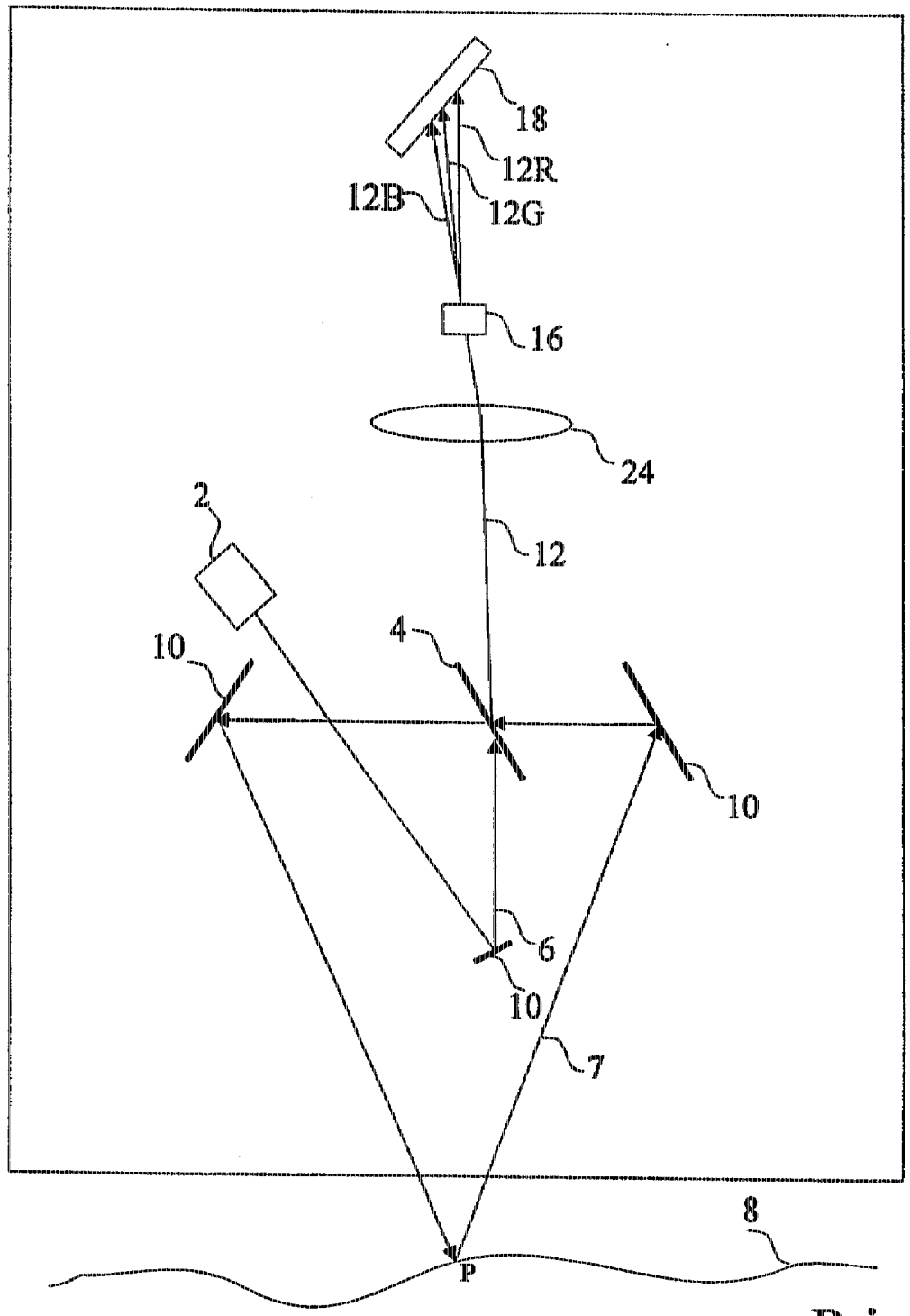
FIG. 1 is a schematic illustration of a prior art apparatus used for three dimensional color imaging.

Referring now to prior art FIG. 1, a synchronous optical triangulation scanning system that functions in accordance with the teachings of Rioux, U.S. Pat. No. 4,627,734 and is essentially alike in structure to the embodiment illustrated in FIG. 12 of such patent is shown. FIG. 1 is also exemplary of a color profile and detection scheme described in U.S. Pat. No. 5,177,556 in the name of Rioux.

A light source 2, e.g. an RGB laser, produces a beam 6 that contains well defined red, green and blue wavelengths of light. Together with fixed mirrors 10 one surface of an oscillating double-sided mirror 4 scans the beam 6 in the x direction and projects it toward an object 8. Light 7 received back from a point P on the target surface of the object 8 is returned by a further fixed mirror 10, the opposite surface of the mirror 4, and a lens 14 in the form of a return beam 12 that is imaged onto a position sensitive detector 18. e.g. a CCD. Interposed in this beam 12 is a device 16 for dispersing the beam into separate return beams 12B, 12G, and 12R of the three primary colors. While the dispersal device 16 can be a simple wedge, it is preferable to use either a double wedge, or other device that will achieve a collinear effect, at least for one of the beams, preferably the green beam. In other words the beam 12G will be in a straight through continuation of the beam 12. The detector 18 measures the amplitudes A and the positions D of the respective beams to generate signals 17B, 17G, and 17R (not shown here). The position of any one of these signals indicates the range of the point P, i.e. the deviation of the point P in the Z direction. The detector 18 is slanted to this optical axis because the focal plane varies with range. Since the positions of the signals 17R, 17G, and 17B relative to each other do not vary substantially, any one, two or all of these signals can be used to measure the Z deviation. Usually the signal with the greatest amplitude is be chosen for this purpose. If the color of the object is such that one of these signals is absent or is too small to measure, the colors of the two remaining signals can be identified by their spacing from each other. In some instances this limitation of requiring a minimum of two signals relating to two colors or well defined wavelengths may be acceptable, however in other instances where only one well defined wavelength is present this system has been found to be inadequate. For example, if the object is absent of red or green, color information cannot be determined without apriori knowledge of the absence of red and green. In other instances where the object is grey and or dark, color information may not be accurately determined, due to the low-level of light available from each wavelength.

The exemplary embodiment described hereafter is confined to a system having a laser that produces red, green and blue wavelengths of light. Of course, in a more general embodiment a light source can comprise other well defined wavelengths $\lambda_1 \ldots \lambda_N$ wherein complementary detectors are provided for detecting these wavelengths of light $\lambda_1 \ldots \lambda_N$.

Figure 2:
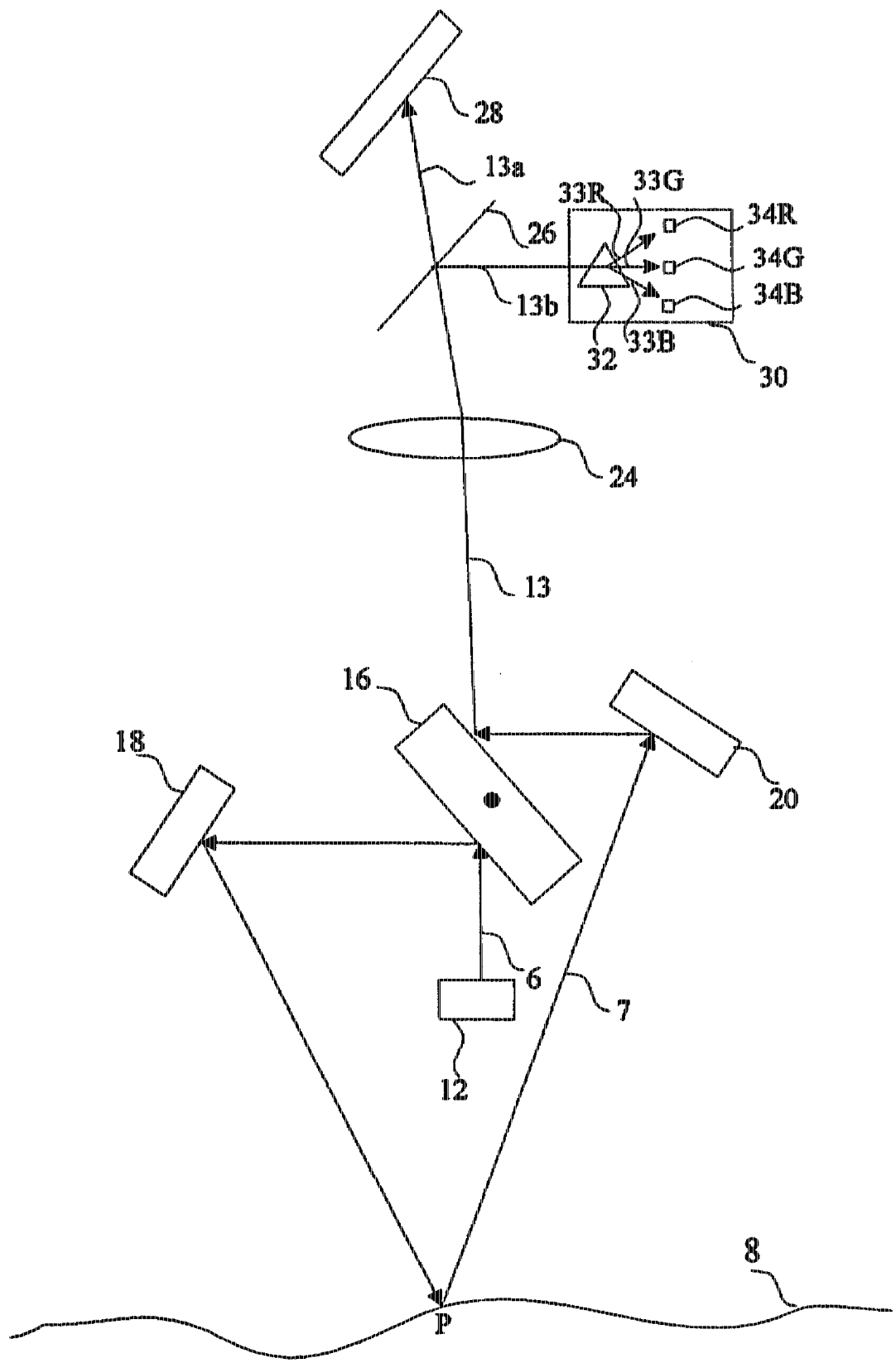
FIG. 2 is a schematic illustration of a scanning device in accordance with the invention; and, FIG. 3 is a schematic illustration of a second embodiment of the invention including noise reduction circuitry.

Referring now to FIG. 2, an embodiment of the invention is shown having means for directly extracting color information in the form of three photodiode detectors. Each of the photo detectors are conveniently positioned to receive one of red, green and blue light. Thus if only blue light is present, a photo detector in the path of the blue wavelengths will detect its intensity. This embodiment provides several advantages over the teachings of Rioux in U.S. Pat. No. 5,177,556. It allows the detection of a single primary color in the absence of the other two; and it provides system for detecting profile information that is less sensitive to low light conditions.

A light source in the form of an RGB laser 12 produces a beam 6 that contains well defined red, green and blue wavelengths. Together with fixed mirror 18 one surface of an oscillating double-sided mirror 16 scans the beam 6 in the x direction and projects it toward a target object 8. Light 7 received back from the target surface of the object 8 is returned by the further fixed mirror 20, the opposite side of the oscillating double sided mirror 16 and a lens 24 in the form of a return beam 13, a large portion of which is imaged onto an intensity sensitive detector 28. e.g. in the form of a charged coupled device (CCD) array. Profile information is calculated in the same manner as is taught in prior art U.S. Pat. No. 5,177,566, however, the arrangement of this embodiment is capable in some instances of providing more light for detection by the detector 28, thus yielding better results when the object is dark or dark grey in color. Interposed in this beam is a beam splitter 26 for splitting the beam 13 into two separate return beams 13a, and 13b. The beam 13a is transmitted through to the detector 28 and the beam 13b which may typically only be comprised of a few percent of the energy of the beam 13 is reflected and directed to a means 30 for determining the color content of the beam 13a. In this embodiment means 30 is comprised of a prism 32 for dispersing the beam into separate return beams 33R, 33B, and 33G of the three primary colors red, blue and green. While the dispersal device 32 can be a simple prism, alternatively a diffractive element such as a grating or a holographic dispersive element could be used. Three detectors, 34K, 34B, and 34G, are positioned to receive the separate return beams 33R, 33B, and 33G respectively. Each detector is not only capable of determining the presence of one of the separate beams, but also provides an analog output signal that is representative of the intensity of a beam incident upon it; thus I(r), I(g) and I(b) are the intensity values for the red green and blue light that are recorded. With A/D converters, the analog signals may more conveniently be stored as in a digital form for later processing. Advantageously, and in contrast to the prior art, this arrangement allows a single color to be detected, in the absence of the other two colors. Furthermore, the beam 13a is a single beam of light comprised of most of the signal energy of the transmitted signal 6, and this concentrated energy is focused onto the CCD array 28 rather than being divided up into three separate beams directed at three separate areas. Thus the light used to determine the positional information is not diluted and substantially all of the light present in a single beam, having considerable energy relative to the prior art scheme, is utilized; As a result, this scheme is more tolerant of low light conditions where the object is, for example, dark gray in color.

Figure 3:
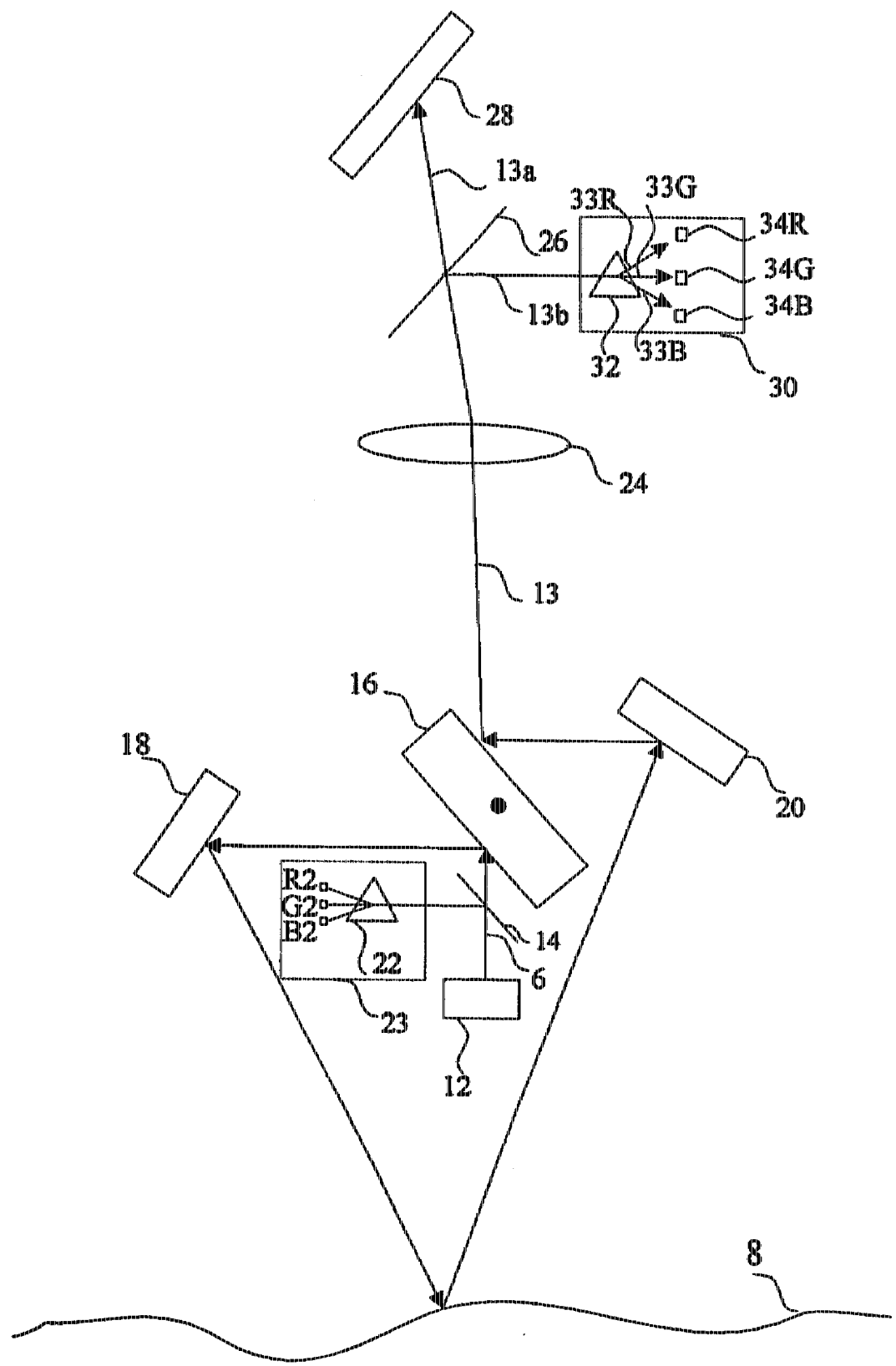

Turning now to FIG. 3, an alternative embodiment is shown that includes means in the form of normalization circuitry for eliminating some of the unwanted effects of noise present at the input on signal 6. Furthermore, this embodiment eliminates some of the unwanted effects due to fluctuations that may be present in the source light.

A means to reduce the unwanted effect of noise present at the input of the scanning system is provided in the form of a circuit 23 that taps a small portion of the light generated by the light source 12 while the object, for monitoring purposes. A beam splitter 14 performs the tapping function however, most of the light generated by the laser source is transmitted to the oscillating double-sided mirror 16 as will be described. The circuit 23 further includes a prism 22 for dispersing/demultiplexing the tapped light into separate beams R2, B2, and G2 of the three primary colors red, blue and green. Of course, other wavelength demultiplexing means may be envisaged. Three separate monitoring detectors in the form of photodiodes 25R, 25B, and 25G are positioned to detect the intensity of the three separate beams.

In operation the circuit 23 is provided to monitor a small portion of the input light signal generated by the laser 12. By so doing, the small portion of monitored light can be used to eliminate noise present at the output that is a function of noise present at the input. This removal of noise is accomplished through a normalization process. The three monitoring photodiodes 25R, 25G, and 25B provide values I(R), I(G) and I(B) respectively, representing the intensity value for each color projected to the scene or object 8; these values are converted from analog to digital values and are stored in a computer memory for the purpose of color normalization.

The normalization process is essentially of a ratio of a constant times the detected input light:the detected output light.

A suitably programmed processor executes the following calculations:

$$R(N)=K_R[I(r)/I(R)]$$

$$G(N)=K_G[I(g)/I(G)]$$

$$B(N)=K_B[I(b)/I(B)]$$

where R(N), G(N) and B(N) are the normalized values and $K_R$, $K_G$ and $K_B$ are experimentally obtained calibration constants.

Thus the effect of noise present at the input is substantially reduced at the output by this normalization process and the values R(N), G(N) and B(N) are the normalized noise reduced output signals.

By the provision of separate color detection, and noise reduction circuitry, it is believed that this invention provides a more robust, accurate, and useful system, than the prior art has offered. Numerous other embodiments and variations of this invention may be envisaged, without departing from the spirit and scope of this invention. For example, designs based on the teachings of this invention may be contemplated, utilizing integrated circuitry and components, such as Bragg optical fiber gratings, or monolithic devices that include wavelength division demultiplexing and detecting capabilities.

We claim:

1. An optical method of determining the color and profile of a target surface comprising the steps of:
   (a) scanning the target surface with an incident beam of light containing a plurality of wavelengths including at least one well defined wavelength;
   (b) splitting a return beam that has reflected from the target surface into a plurality of separate return beams including at least a first and second return beam;
   (c) utilizing the first return beam that has reflected from the target surface for detecting the profile of the target surface;
   (d) utilizing the second return beam to detect color information corresponding to the target surface;
   (e) providing the second return beam to a means for detecting one or more of red, green, and blue spectral contents; and
   (f) generating signals representative of the respectively colored spectral content of the second return beam from the target surface.

2. A method of determining the color and profile of a target surface as defined in claim 1, further comprising the steps of:
   (i) tapping a portion of the beam of light before the step of scanning the target surface;
   (ii) providing the tapped portion of the beam to a means for detecting the spectral content of the tapped portion of the beam and generating signals representative of the spectral content of the tapped portion of the beam;
   (iii) generating said signals representative of the red, green, and blue content of the tapped portion of the beam and,
   (iv) determining as a function of the signals representative of the spectral content of the tapped portion of the beam and the signals representative of the color of the target surface, normalized values representative of the color of the target surface.

3. An optical method of determining the color and profile of a target surface as defined in claim 2, wherein the tapped beam and the beam of light incident upon the target surface contain substantially the same proportions of red, green and blue spectral contents.

4. An optical method of determining the color and profile information as defined in claim 2, wherein the step of providing the tapped portion of the beam to a means for detecting the spectral content of the tapped portion of the beam further comprises the step of detecting the red, green and blue contents of the tapped portion of the beam for generating signals representative of the red, green, and blue spectral contents of the tapped portion of the beam.

5. An optical apparatus for determining the color and profile of a target surface comprising:
   (a) means for scanning the target surface with an incident beam of light containing a plurality of wavelengths including at least one well defined wavelength;
   (b) means for splitting the return beam that has reflected from the target surface into a plurality of separate return beams, including at least a first return beam and a second return beam;
   (c) means for detecting the profile of the target surface in response to the first return beam that has reflected from the target surface; and
   (d) means for detecting color information corresponding to the target surface in response to the second return beam, further comprising
      a means for dispersing the second return beam into a plurality of separate beams according to their wavelengths and
      a plurality of detectors spaced apart and positioned to receive the plurality of separate beams.

6. An optical apparatus for determining the color and profile of a target surface as defined in claim 5, including means for reducing noise present at an input of the apparatus.

7. An optical apparatus for determining the color and profile of a target surface as defined in claim 6, further comprising:
   (i) means for tapping a portion of the incident beam of light before scanning the target surface, said means being capable of providing a tapped beam of light;
   (ii) means for detecting the spectral content of the tapped beam and generating signals representative of the respective spectral content of the tapped portion of the beam; and,
   (iii) means for determining as a function of the signals representative of the spectral content of the tapped portion of the beam and signals representative of the color of the target surface, normalized values representative of the color of the target surface.

8. An optical apparatus for determining the color and profile of a target surface defined in claim 7, wherein the means for determining the spectral content detects the red, green and blue spectral content of the tapped beam and generates signals representative of the red, green, and blue spectral content of the tapped portion of the beam.

9. An optical apparatus for determining the color and profile of a target surface as defined in claim 8, including means for dispersing the tapped beam into a plurality of separate tapped beams according to their wavelengths and a plurality of detectors spaced apart and positioned to receive the plurality of separate tapped beams.

10. An optical apparatus for determining the color and profile of a target surface as defined in claim 8, wherein the means for detecting the red, green and blue content of the tapped beam and generating signals representative of the red, green and blue content of the tapped portion of the beam further comprises
   a means for dispersing the tapped beam into a plurality of separate tapped beams according to their wavelengths and
   a plurality of detectors spaced apart and positioned to receive the plurality of separate tapped beams.

* * * * *